United States Patent
Hashimoto et al.

[11] Patent Number: 5,105,405
[45] Date of Patent: Apr. 14, 1992

[54] OBJECTIVE LENS DRIVING DEVICE

[75] Inventors: Akira Hashimoto; Kenjiro Kime, both of Kyoto, Japan

[73] Assignee: Mitsubishi Denki Kabushiki Kaisha, Kyoto, Japan

[21] Appl. No.: 329,899

[22] PCT Filed: Jun. 24, 1988

[86] PCT No.: PCT/JP88/00627
§ 371 Date: Apr. 24, 1989
§ 102(e) Date: Apr. 24, 1989

[87] PCT Pub. No.: WO88/10492
PCT Pub. Date: Dec. 29, 1988

[30] Foreign Application Priority Data
Jun. 25, 1987 [JP] Japan .................. 62-158043

[51] Int. Cl.$^5$ ................................. G11B 7/00
[52] U.S. Cl. .................. 369/44.22; 250/201.1; 359/813; 359/814; 359/823
[58] Field of Search .......... 369/13, 45, 44.11, 44.16, 369/44.26, 44.22, 44.37, 112, 114, 244; 250/201; 350/252, 255, 247, 432

[56] References Cited

U.S. PATENT DOCUMENTS

| | | | |
|---|---|---|---|
| 4,419,614 | 12/1983 | Kimura | 369/44.16 X |
| 4,507,764 | 3/1985 | Musha | 369/44.16 |
| 4,507,765 | 3/1985 | Suzuki et al. | 369/44.12 X |
| 4,759,005 | 7/1988 | Kasahara | 369/44.16 X |
| 4,769,803 | 9/1988 | Yamamiya | 369/44.16 |
| 4,790,628 | 12/1988 | Nanno et al. | 369/44.22 X |
| 4,792,935 | 12/1988 | Kime et al. | 369/44.22 |
| 4,799,766 | 1/1989 | Estes | 350/255 X |
| 4,817,076 | 3/1989 | Van Sluys et al. | 350/255 X |
| 4,863,240 | 9/1989 | Nakajima et al. | 350/255 X |

FOREIGN PATENT DOCUMENTS

| | | |
|---|---|---|
| 0222565 | 5/1987 | European Pat. Off. |
| 2537734 | 6/1984 | France |
| 2588990 | 4/1987 | France |
| 2154023 | 8/1985 | United Kingdom |

Primary Examiner—Paul Ip

[57] ABSTRACT

An objective lens driving device of a sliding shaft type is mounted on an optical information recording and reproducing apparatus. The objective lens driving device includes an armature unit having a magnet magnetized in a plurality of pairs of magnetic poles, and a stator unit having a yoke, and control coils mounted on the yoke. The magnet is disposed with the boundaries between the magnetic poles which are respectively opposite gaps formed in the yoke. The objective lens driving device has an improved reliability and a reduced number of component parts.

17 Claims, 8 Drawing Sheets

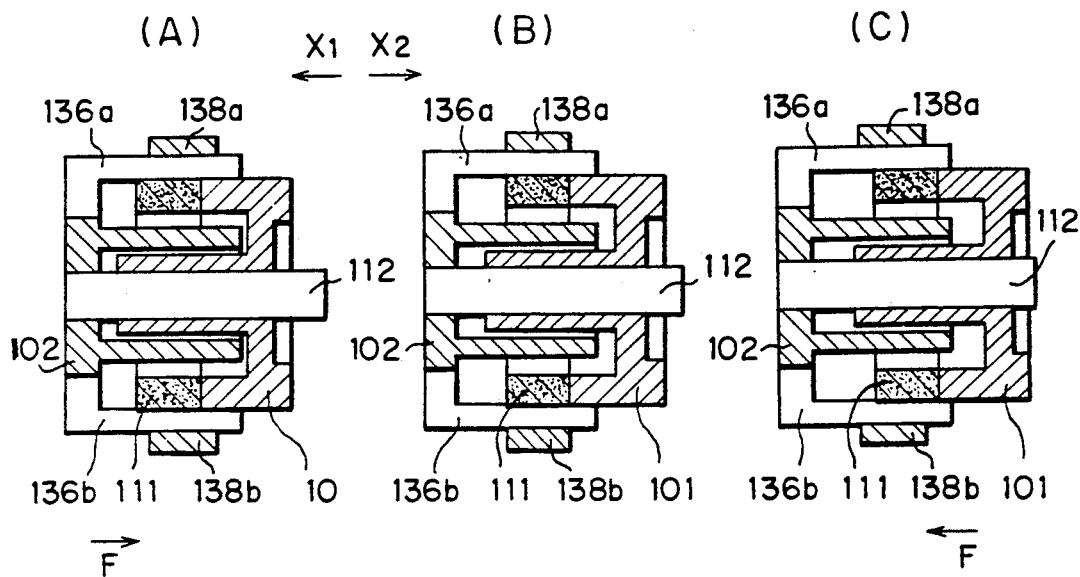
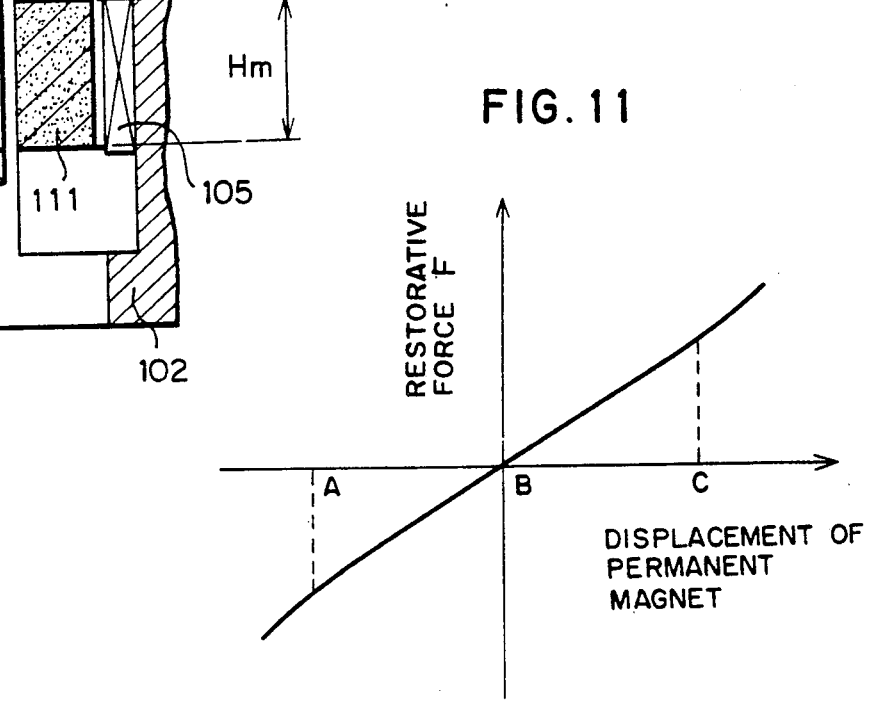

OBJECTIVE LENS DRIVING DEVICE

TECHNICAL FIELD

The present invention relates to an objective lens driving device and, more particularly, to an objective lens driving device employing a permanent magnet and control coils.

BACKGROUND ART

Recently, optical information recording systems capable of stably recording a large amount of information at a very high recording density have as optical disks, compact disks or external recording equipments for computers.

An objective lens is an essential component of such an optical recording system to focus a light beam in a spot of light on the information recording surface of an optical information recording medium to read or write information. An objective lens driving device for the positional control of the objective lens plays a very important role in correcting the tracking error and the focusing error of the spot of light.

FIG. 1 is an exploded perspective view of a conventional objective lens driving device.

The objective lens driving device shown in FIG. 1 includes armature holder 1 and a base yoke 2.

The upper portion of the armature holder 1 is formed in the shape of an oblate hexagon or a rhombus having one end fixedly provided with an objective lens 3 and the other end fixedly provided with a counterweight 4 for counter-balancing the objective lens 3. A focus control coil 5 and track control coils 6a, 6b, ... are disposed in a cylindrical arrangement on the bottom center of the armature holder 1.

The objective lens 3 and the counterweight 4 thus mounted on the armature holder 1 are fitted respectively in openings 7a and 7b formed near the opposite sides of a substantially square supporting rubber member 7. The supporting rubber member 7 is fastened to a stator base 9 with screws 8a and 8b.

The stator base 9 is provided with a central opening 9a. The control coils 5 and 6 disposed on the armature holder 1 project downward through the opening 9a. A cover 10 is attached to the upper surface of the stator base 9.

The base yoke 2 includes a holding yoke 13 for holding permanent magnets 11a and 11b and a support shaft 12, and yokes 14a and 14b attached to the upper surfaces of the permanent magnets 11a and 11b, respectively.

The armature holder 1 is mounted on the support shaft 12 so as to be axially slidable and rotatable relative to the base yoke 2.

FIG. 2 is a longitudinal sectional view of the assembly of the armature holder 1 and the base yoke 2, in which the parts corresponding to those shown in FIG. 1 are denoted by the same reference numerals and the description thereof will be omitted.

As is obvious from FIG. 2, a coil holder 15 is disposed on the bottom surface of the armature holder 1. The focus control coil 5 and the track control coils 6 are fixed to the coil holder 15.

The armature holder 1 is provided on the bottom thereof with a cylindrical bearing 16, which receives the support shaft 12 therein.

The control coils 5 and 6 are fixed to the armature holder 1 as shown in FIG. 3.

The focus control coil 5 is attached to the coil holder provided on the bottom of the armature holder 1, and the track control coils 6a, 6b, 6c and 6d are fixed to the focus control coil 5. Leads 17a, 17b, ... and 17j lead out from the coils.

Motions of the conventional objective lens driving device will be described hereinafter. A light beam, such as a laser beam, is emitted through the objective lens 3 so as to be focused in a spot of light on an optical information recording medium, such as an optical disk. When the light beam is out of focus, the objective lens 3 can be focused by supplying a control current corresponding to a focal displacement to the focus control coil 5 to slide the armature holder 1 in either of the directions indicated by a double-head arrow A due to the interaction between the control current and the permanent magnets 11. Although the armature holder 1 is joined through the objective lens 3 and the counterweight 4 to the supporting rubber member 7, the objective lens 1 is slidable because the supporting rubber member 7 is bendable.

When the spot of light deviates from a track, the track control movement of the objective lens 3 can be achieved by supplying a control current corresponding to the deviation of the spot of light from the track to the track control coils 6a, 6b, ... and 6d to turn the armature holder 1 in either of the directions indicated by a double-head arrow B due to the interaction between the control current and the permanent magnets 11.

The conventional objective lens driving device thus constructed has a problem that it is difficult to manufacture the objective lens driving device.

That is, the leads 17a, 17b, ... and 17j of the focus control coil 5 and the track control coils 6a, 6b, ... and 6d included in the armature unit of the objective lens driving device must be connected to the stator unit, which requires difficult wiring work. Moreover, because the armature unit and the stator unit are interconnected by the supporting rubber member 7 to set the center of a range of track control movement in which the armature unit of the objective lens driving device can be moved for track control, it is difficult to assemble the armature unit and the stator unit.

Furthermore, the lead wiring work and the attachment of the supporting rubber must be carried out strictly, or troubles occur in the control actions of the objective lens driving device.

SUMMARY OF THE INVENTION

It is an object of the present invention to provide an excellently producible and highly reliable objective lens driving device requiring no work for wiring leads from the armature unit and no work for attaching a supporting rubber member.

To achieve the object, the present invention provides an objective lens driving device comprising an armature holder for holding an objective lens, and a driving mechanism for turning and sliding the armature holder.

The driving mechanism comprises a permanent magnet provided on the armature holder, a stator yoke disposed opposite to the magnetic poles of the permanent magnet, a focus control coil and track control coils disposed in the gap between the permanent magnet and the yoke and fixed to the yoke. The driving mechanism has gaps that are formed in the circumference of the yoke disposed opposite to the permanent magnet.

The objective lens driving device in accordance with the present invention comprises the foregoing components. Accordingly, the permanent magnet is provided on the armature holder, the control coils are arranged on the yoke, and hence the armature unit need not be provided with leads. Furthermore, because the gaps are formed in the yoke, the magnetic flux density in the gaps is reduced and a tendency of low-magnetic-flux-density portions of the annular permanent magnet coming opposite to the gaps is enhanced. Hence, it is possible to set the center of a range of track control movement of the armature unit in the driving device even if the driving device is not provided with any supporting rubber member.

Thus, the objective lens driving device in accordance with the present invention eliminates work for wiring the leads and work for attaching the supporting rubber member. Thereby, the objective lens driving device has excellent producibility and higher reliability.

In the objective lens driving device in accordance with the present invention, the permanent magnet is arranged in the stator unit accordingly, there are no leads extending in the stator unit, and hence there is no lead extended from the armature unit and no work for wiring leads is necessary.

Furthermore, because the interactions of the gaps formed in the yoke and the permanent magnet enables the retention of the center of a range of track control movement of the armature unit, the armature unit need not be provided with any supporting rubber member.

Thus, the objective lens driving device eliminates the delicate work for interconnecting the armature unit and the stator unit, and hence the objective lens driving device has excellent producibility and high reliability.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIGS. 9 to 11 are illustrations explaining the retaining function of the center of focus control movement of the objective lens driving device in the first embodiment;

DETAILED DESCRIPTION OF THE PREFERRED EMBODIMENTS OF THE INVENTION

Figure 1:
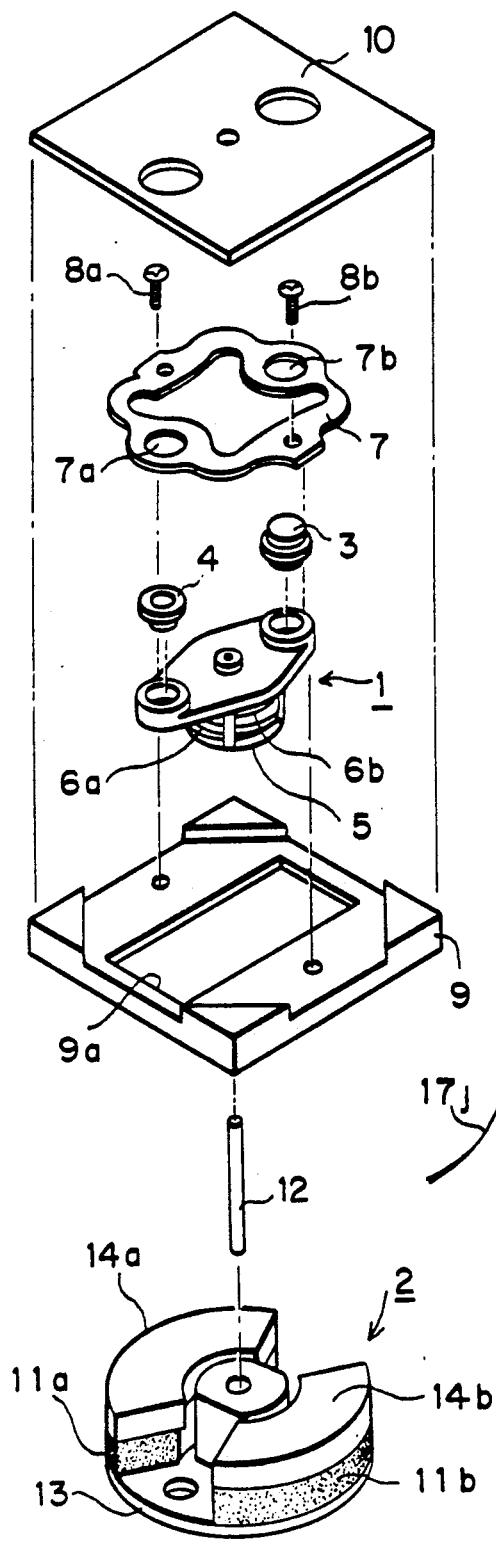
FIGS. 1 to 3 are illustrations explaining a conventional objective lens driving device.
Figure 2:
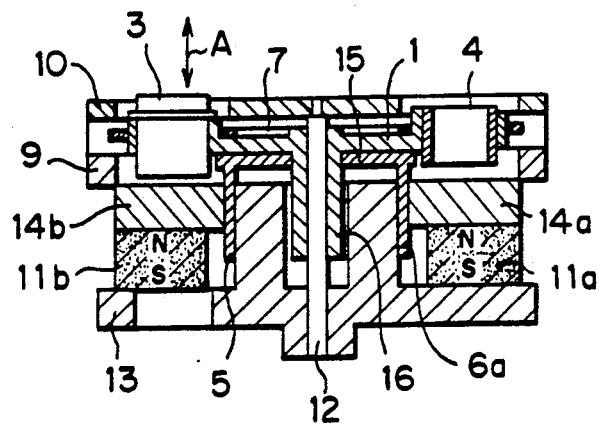
Figure 3:
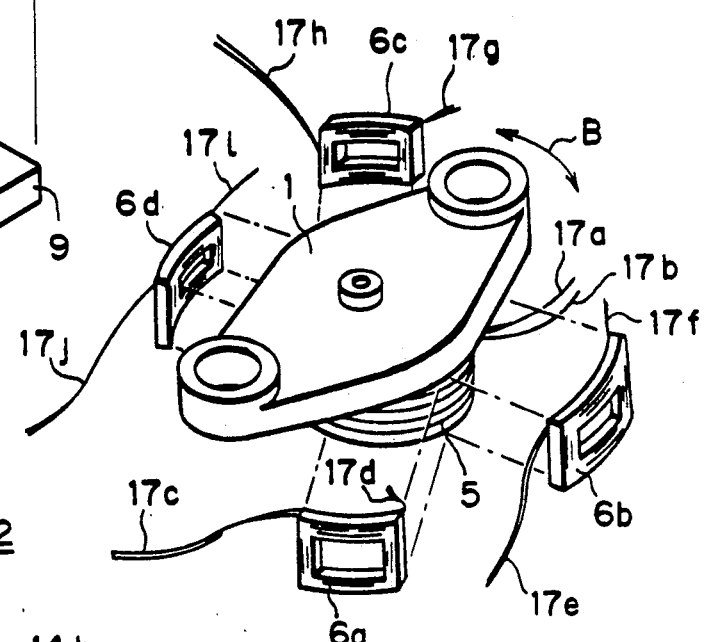
Figure 4:
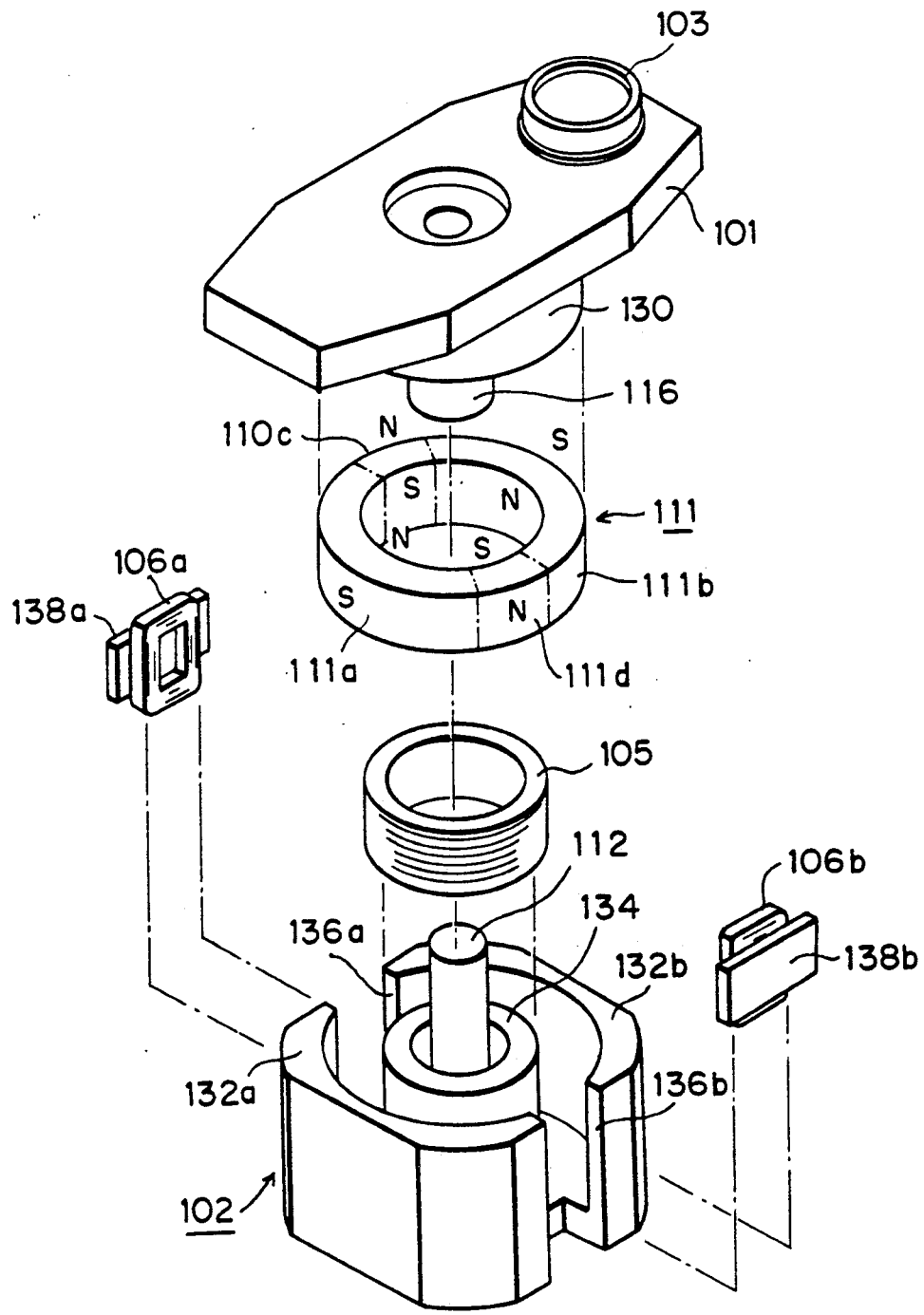
FIGS. 4 to 6 are illustrations explaining the construction of an objective lens driving device in a first embodiment according to the present invention.

FIG. 4 is an exploded perspective view of an objective lens driving device in a first embodiment according to the present invention, in which parts corresponding to those of the foregoing conventional objective lens driving device are denoted by reference numerals obtained by adding 100 to those of corresponding parts and the description thereof will be omitted to avoid duplication.

The present invention has a permanent magnet that is arranged on an armature holder, control coils are arranged on a yoke of a stator unit, and gaps that are formed in a base yoke at positions facing the permanent magnet.

Accordingly, an armature holder 101 employed in an objective lens driving device in the first embodiment is provided with a cylindrical bearing 116 near the central portion thereof. An objective lens 103 is fixed to the armature holder 101 at an eccentric position at a predetermined distance from the bearing 116. An annular skirt 130 extends downward from the bottom of the movable holder 101, and an annular permanent magnet 111 magnetized radially and symmetrically in four magnetic poles is fixedly held on the annular skirt 130. The polarity of the poles 111a and 111b of the annular permanent magnet 111 on the same circumference is the same, and the polarity of the poles 111c and 111d of the annular permanent magnet 111 on the same circumference is the same.

On the other hand, the circumferential wall of a substantially cylindrical base yoke 102 is divided into two portions forming outer projections 132a and 132b. A support shaft 112 extends upright from the substantially central portion of the base yoke 102. An inner projection 134 is formed concentrically with the outer projections 132a and 132b between the outer projections 132a and 132b, and the support shaft 112.

Gaps 136a and 136b are formed symmetrically between the outer projections 132a and 132b so as to coincide respectively with the boundary between the poles 111a and 111c of the annular permanent magnet 111 and the boundary between the poles 116b and 116d of the annular permanent magnet 111.

A focus control coil 105 is disposed around and fixed to the outer circumference of the inner projection 134. Track control coils 106a and 106b respectively wound on back yokes 138a and 138b are fixedly disposed respectively in the gaps 136a and 136b. The track control coils 106a and 106b have each a rectangular shape and are disposed so that the directions of vectors of magnetic flux intersecting with each other on one of the sides substantially parallel with the axis of the support shaft 112 and the other side are substantially opposite to each other.

Figure 5:
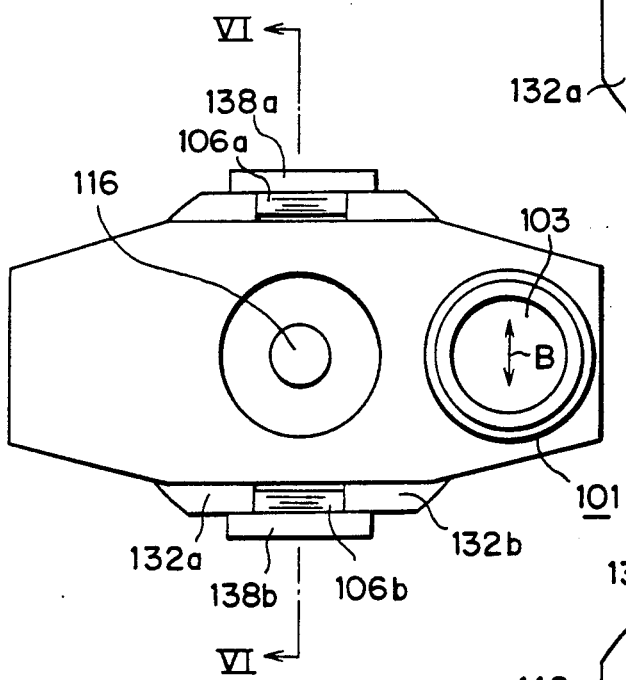
Figure 6:
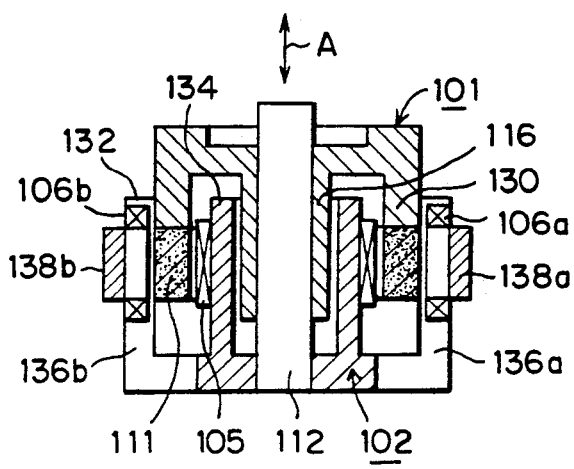
Figure 13:
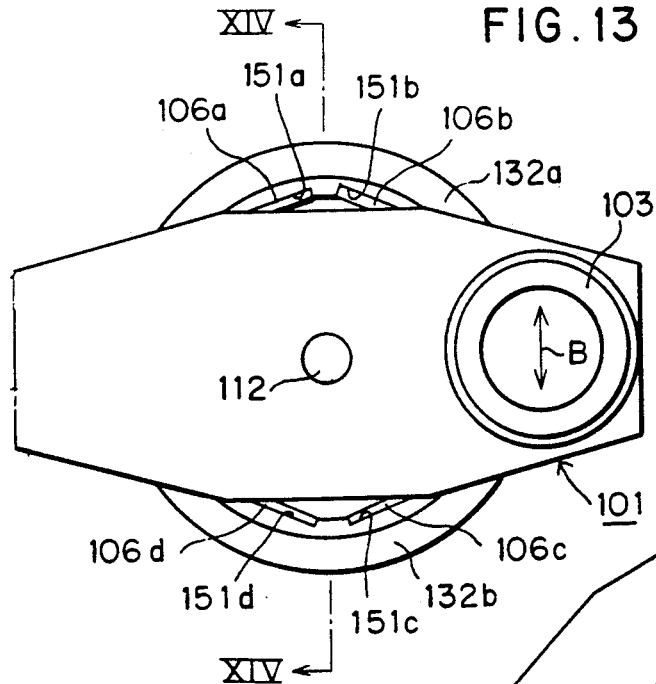
FIGS. 12 to 16 are illustrations explaining a modification of the retaining function of the center of focus control movement of objective lens driving device in the first embodiment.

In assembling the objective lens driving device having the aforesaid construction, the support shaft 112 fixed to the base yoke 102 is inserted in the bearing 116 of the armature holder 101 as shown in FIGS. 5 and 6.

FIG. 5 is a top plan view of the objective lens driving device in the first embodiment according to the present invention, and FIG. 6 is a longitudinal sectional view taken on line VI—VI in FIG. 5.

The operation of the objective lens driving device in the first embodiment thus constructed will be described hereinafter.

Similar to the operation of the foregoing conventional objective lens driving device, a laser beam is emitted through the objective lens 103 and focused in a spot of light on the information recording surface of an optical information recording medium, such as an optical disk. When the spot of light is out of focus, a control current corresponding to a focal displacement is supplied to the focus control coil 105 to slide the armature holder 101 through the permanent magnet 111 in either of the directions indicated by a double-head arrow A for the focus control movement of the objective lens 103.

When the spot of light deviates from a track, a control current corresponding to the deviation of the spot of light from the track is supplied to the track control coils 106a and 106b to turn the armature holder 101 through the permanent magnet 111 in either of the directions indicated by a double-head arrow B for the track control movement of the objective lens 103.

Because the focus control coil 105 and the track control coils 106a and 106b are provided on the base yoke 102, namely, a stator unit, and current need not be supplied to the armature holder 101, namely, an armature unit, wiring work for the leads can be achieved very easily.

Moreover, because the annular permanent magnet 111 is disposed so that the boundaries between the poles 111a and 111c and between the poles 111b and 111d of the annular permanent magnet 111, coincide respectively with the gaps 136a and 136b formed in the base yoke 102, the magnetic flux gradient on the circumference of the permanent magnet 111 changes when the movable holder 101 is turned in either of the directions of the double-head arrow B and a restorative force tending to restore the armature holder 101 to the original position acts on the permanent magnet 111. As a result, the center of track control movement of the armature holder 101 can be retained.

Accordingly, any supporting rubber member, which is necessary for the conventional objective lens driving device, is not necessary, and hence the assembling work is facilitated and no problem occurs in the control operation of the objective lens driving device.

Figure 7:
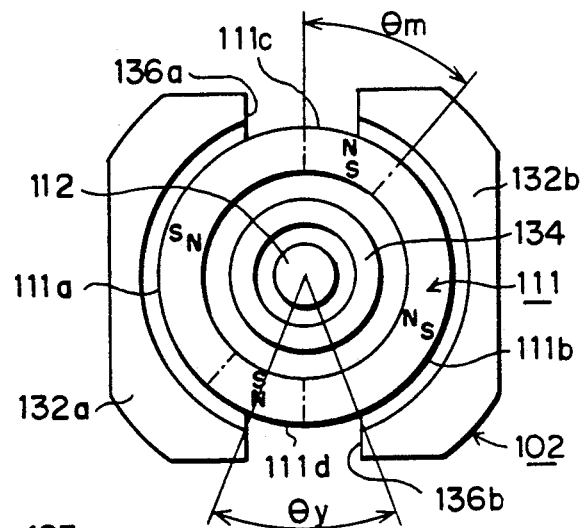
FIGS. 7 and 8 are illustrations explaining the retaining function of the center of track control movement of the objective lens driving device in the first embodiment.

Incidentally, when the permanent magnet 111 is disposed so that the boundaries between the pole faces thereof coincide respectively with the gaps 136a and 136b in FIG. 7, which show the disposition of the base yoke and the permanent magnet, it is preferable for the stable retention of the center of track control movement that the central angle $\theta_m$ of each of the poles 111c and 111d of the annular permanent magnet 111 and the central angle $\theta_y$ of each of the gaps 136a and 136b of the base yoke 102 meet an inequality: $\theta_m \geqq \theta_y$.

Figure 8:
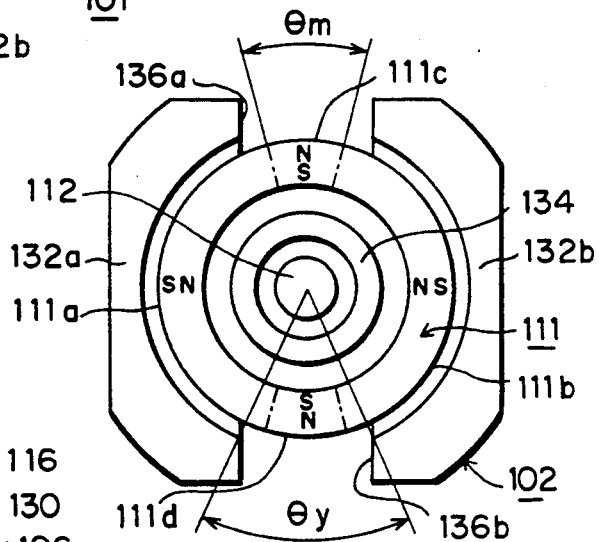

It is also possible to retain the center of track control movement when the poles 111c and 111d of the annular permanent magnets 111 are disposed opposite to the gaps 136a and 136b, respectively, as shown in FIG. 8. In this case, the central angles $\theta_m$ and $\theta_y$ must meet an inequality: $\theta_m < \theta_y$.

An improvement of the performance in retaining the center of track control movement of the armature holder will be described hereinafter with reference to FIGS. 9 through 16.

FIGS. 9 to 11 are illustrations explaining the objective lens driving device in the first embodiment, and FIGS. 12 to 16 are illustrations explaining an objective lens driving device in a modification, in which parts corresponding to those shown in FIG. 4 are denoted by the same reference numerals and the description thereof will be omitted.

Figure 12:
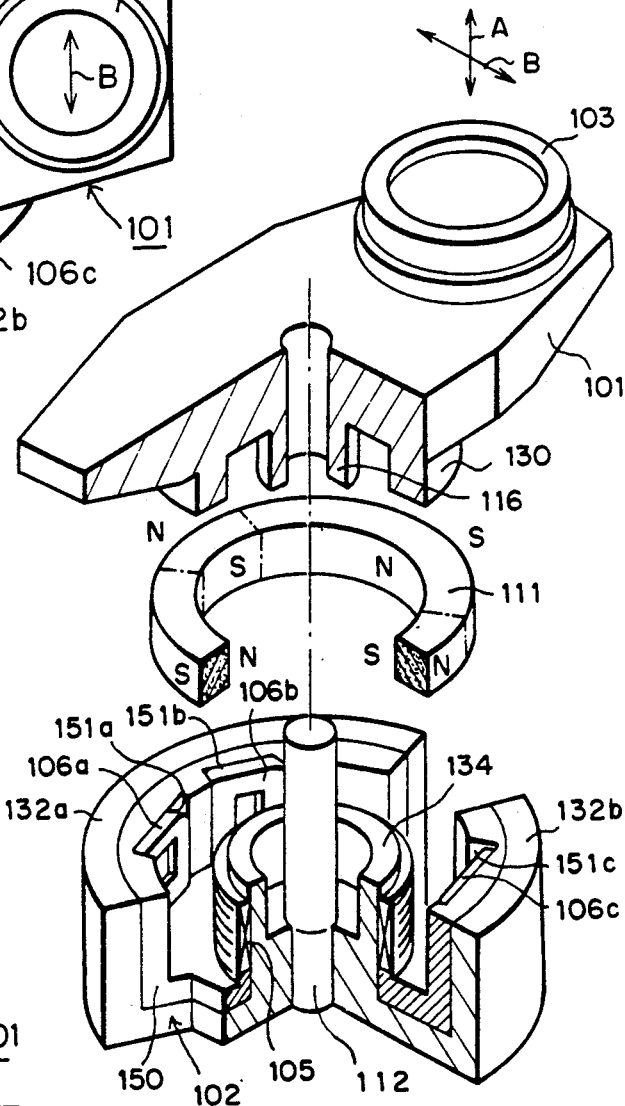
Figure 14:
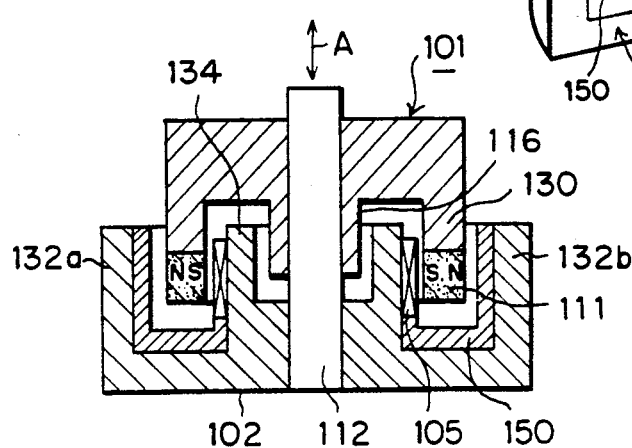

First, the modification will be described with reference to FIGS. 12 through 16. As shown in FIG. 12, coil seats 150 are disposed fixedly on the inner circumference of a base yoke 102 between outer projections 132a and 132b, and an inner projection 134. Track control coils 106a, 106b, 106c and 106d are positioned respectively in recesses 151a, 151b, 151c and 151d formed in the inner surfaces of the coil seats 150.

The track control coils 106a, 106b, 106c and 106d have each a rectangular shape. The track control coils 106a and 106b are disposed adjacently, while the track control coils 106c and 106d are disposed adjacently. A permanent magnet 111 is disposed so that a predetermined gap is formed between the permanent magnet 111 and a focus control coil 105 and a predetermined gap is formed between the permanent magnet 111 and the track control coils 106a, 106b, 106c and 106d. The permanent magnet 111 is magnetized so that the magnetic polarity of a surface facing a portion adjacent to the sides of the track control coils 106a, 106b, 106c and 106d is different from that of another surface on the same circumference.

Figure 15:
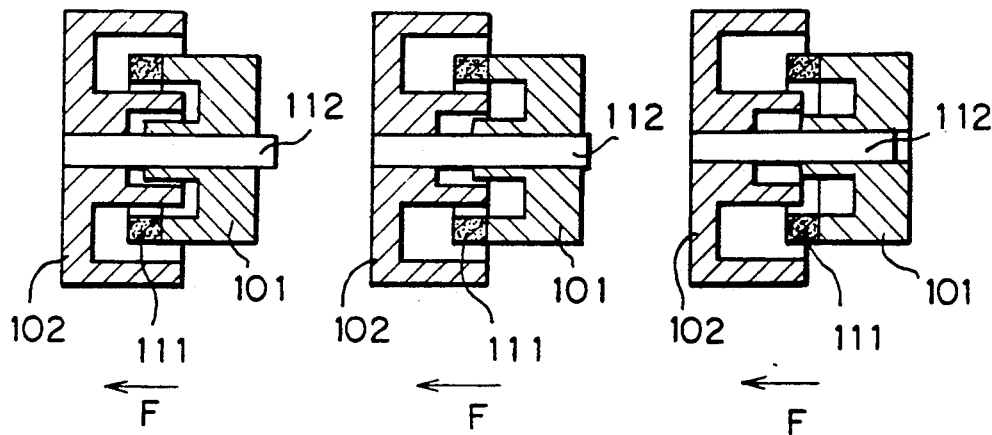

Because this objective lens driving device is thus constructed, the distribution of the magnetic flux density (magnetic flux gradient) on the surface of the permanent magnet 111 changes and a restorative force F acts on the permanent magnet 111 when the permanent magnet 111 is moved in the directions of the arrow A (FIG. 12) as shown in FIGS. 15(A), 15 (B) and 15(C) for focus control.

The restorative force F acts downward (leftward in FIG. 15) in the objective lens driving device. The restorative force F varies gradually as the permanent magnet 111 moves toward the upper open end of the base yoke 102, and increases sharply after the permanent magnet 111 has moved outward beyond the upper end of the base yoke 102, namely, a position shown in FIG. 15(B).

Figure 16:
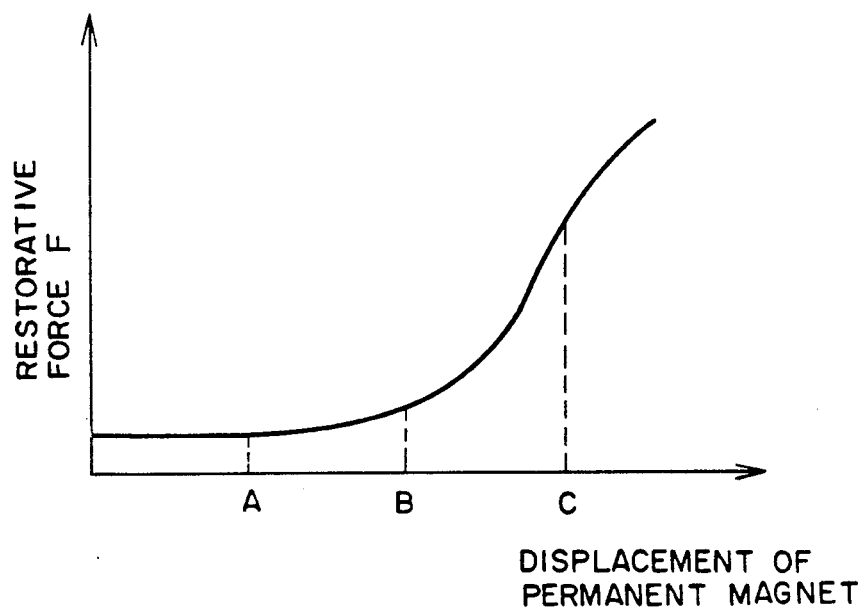

As is obvious from FIG. 16, even when the permanent magnet 111 is at a position shown in FIG. 15(A), namely, even within the base yoke, a little restorative force F acts on the permanent magnet 111.

This restorative force F acting on the permanent magnet 111 makes the movement of the objective lens driving device nonlinear as shown in FIG. 16, which may cause inconvenience to control the movement of the objective lens driving device.

In the first embodiment, i.e., a basic embodiment, back yokes 138a and 138b are disposed opposite to the poles of the permanent magnet 111 as shown in FIG. 9 in an enlarged view. Accordingly, when the permanent magnet 111 is moved in the direction of an arrow X1 for focus control, the restorative force F tending to pull back the permanent magnet 111 acts on the permanent magnet 111 in the direction of an arrow X2 as shown in FIG. 10.

On the other hand, as shown in FIG. 10(C), when the permanent magnet 111 is moved in the direction of the arrow X2, the restorative force F acts on the permanent magnet 111 in the direction of the arrow X1. The restorative force F, as obviously shown in FIG. 11, acts in the opposite direction to that of movement of the permanent magnet 111.

Thus, in the configuration shown in FIG. 9, the back yokes 138a and 138b having a height $H_y$, and the permanent magnet 111 having a height $H_m$ are disposed opposite to each other to retain the permanent magnet 111 at the center corresponding to the center of the height of the back yokes 138a and 138b.

Such central position retention is possible because a magnetic gradient produced by the permanent magnet 111 and the back yokes 138a and 138b when the permanent magnet 111 is moved in the direction of the arrow X1 by a fixed distance δx, and a magnetic gradient produced by the permanent magnet 111 and the back yokes 138a and 138b when the permanent magnet 111 is moved in the direction of the arrow X2 by the fixed distance δx are symmetrical.

In retaining the center of focus control movement with the permanent magnet 111 and the back yokes 138a and 138b, it is appropriate to determine the values of the heights $H_m$ and $H_y$ so that an inequality $H_m \leq H_y$ is satisfied.

An objective lens driving device in a second embodiment according to the present invention will be described hereinafter with reference to FIGS. 17 through 20, in which parts corresponding to those of the first embodiment will be denoted by the same reference numerals and the description thereof will be omitted to avoid duplication.

Figure 17:
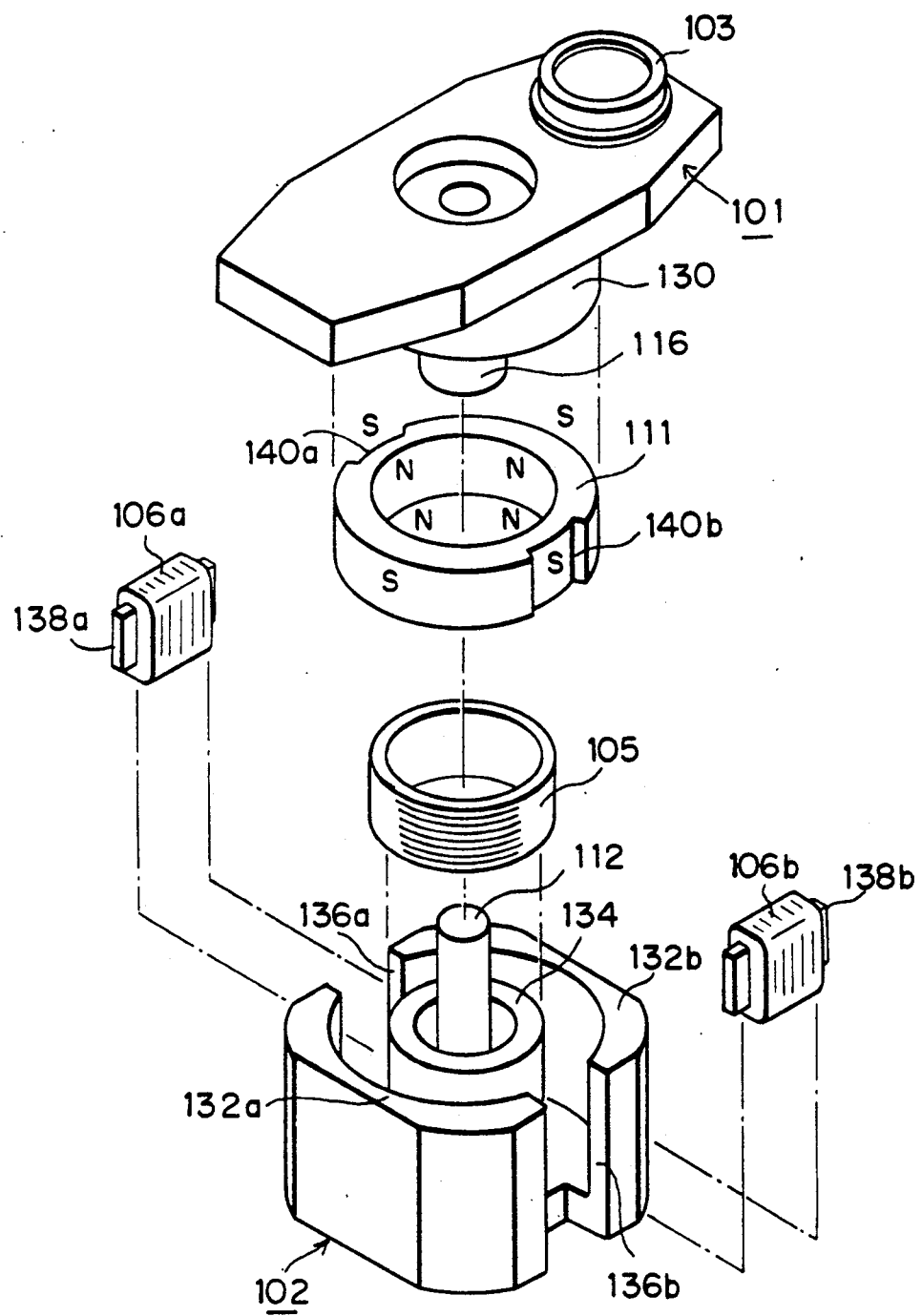
FIGS. 17 to 19 are illustrations explaining the construction of another objective lens driving device in a second embodiment according to the present invention.
Figure 18:
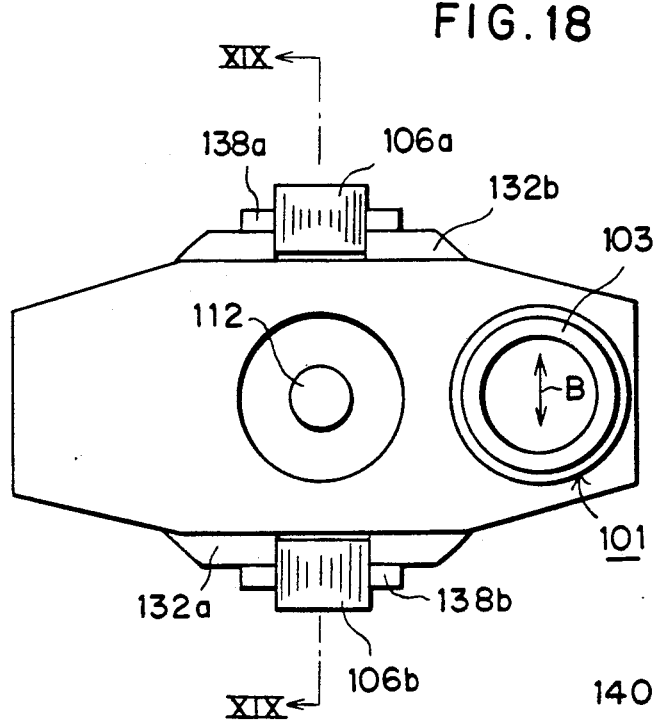
Figure 20:
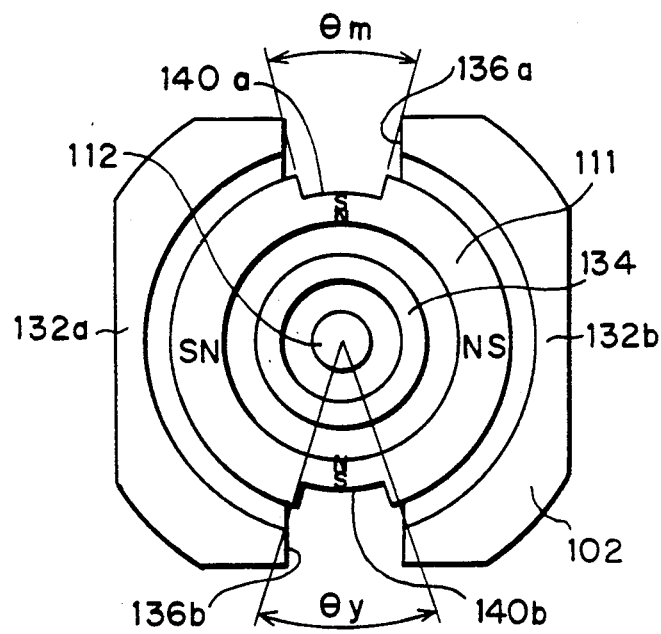
FIG. 20 is an illustration explaining the retaining function of the center of track control movement of the objective lens driving device in the second embodiment.
Figure 19:
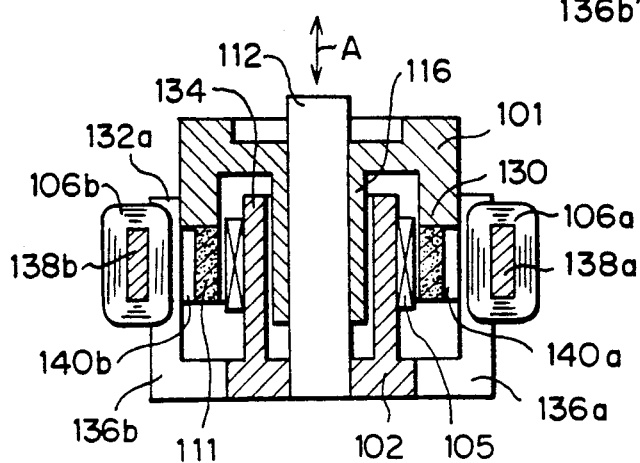

The device in the second embodiment has recesses are formed in the permanent magnet 111. Referring to FIG. 17, the annular permanent magnet 111 has S-poles on the outer circumference thereof, N-poles on the inner circumference thereof, and recesses 140a and 140b formed diametrically in the outer circumference thereof. The permanent magnet 111 is disposed with the recesses 140a and 140b thereof positioned respectively opposite the gaps 136a and 136b of the outer projection 132.

In the second embodiment, the track control coils 106 are wound respectively on the back yokes 138 and are disposed fixedly and respectively in the gaps 136a and 136b of the outer projection 132 of the base yoke 102 opposite to the permanent magnet 111.

The operation of the objective lens driving device in the second embodiment thus constructed will be described hereinafter.

Similar to the operation of the first embodiment, a desired control current is supplied to the focus control coil 105 to slide the armature holder 1 in either of the directions of a double-head arrow A (FIG. 19) for the focus control movement of the objective lens 3.

A desired current is supplied to the track control coils 106a and 106b to turn the armature holder 1 in either of the directions of a double-head arrow B (FIG. 18) for the track control movement of the objective lens 103.

In the second embodiment, because the permanent magnet 111 is disposed with the recesses 140a and 140b thereof respectively opposite the gaps 136a and 136b of the base yoke 102, the magnetic flux gradient on the circumference of the permanent magnet 111 changes when the armature unit represented by the armature holder 101 is turned in either of the directions of the arrow B, and then a restorative force tending to restore the armature unit to its original position acts on the permanent magnet 111, which enables the retention of the center of track control movement of the armature holder 101. In retaining the center of track control movement of the armature holder 101 with the recesses 140a and 140b of the permanent magnet 111, and the gaps 136a and 136b in the base yoke 102, it is preferable for the stabilization of the driving efficiency and the retention of the center to determine the values of the central angle $\theta_m$ of the recesses 140a and 140b of the permanent magnet 111 and the central angle $\theta_y$ of the gaps 136a and 136b shown in FIG. 20 so that an inequality $\theta_y \geq \theta_m$ is satisfied.

As is apparent from the foregoing description, the objective lens driving device in accordance with the present invention is useful as a lens positioning mechanism for controlling the objective lens of an optical information recording system to correct the focusing and tracking errors of the objective lens. Particularly, the objective lens driving device eliminates unnecessary members to facilitate the assembling work, is improved in reliability, and is suitable for the highly accurate positioning of the lens.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. An objective lens driving device comprising:
    an armature holder rotatably and slidably supported by a support shaft;
    an objective lens mounted on said armature holder at an eccentric position with respect to the support shaft; and
    a driving mechanism for driving said holder in turning and sliding motions to control focusing and tracking of a spot of light focused on an optical information recording medium through the objective lens, said driving mechanism including,
    a permanent magnet provided on said holder,
    a base yoke of a stator unit disposed opposite to the pole surfaces of said permanent magnet and having gaps formed in the circumference thereof so as to extend in parallel with the support shaft,
    track control coils for tracking the spot of light on an information recording track formed in optical information recording medium by turning said holder, disposed in a space formed including the gaps including the gaps of said base yoke, and fixed to said base yoke, and
    a focus control coil for sliding said holder along the support shaft to focus the light beam in a spot of light on the information recording surface of the medium, disposed in the space, and fixed to said base yoke.

2. An objective lens driving device according to claim 1, wherein said permanent magnet is an annular permanent magnet magnetized in directions substantially perpendicular to the axis of the support shaft with a plurality of pairs of magnetic poles, the gaps formed in the circumference of said base yoke confront at least one boundary between the magnetic poles of said permanent magnet.

3. An objective lens driving device according to claim 2, wherein the boundaries between the magnetic poles of said annular permanent magnet and the gaps formed in said base yoke are arranged symmetrically with respect to the axis of the support shaft, and said annular permanent magnet has at least four boundaries.

4. An objective lens driving device according to claim 2, wherein said annular permanent magnet is disposed with one of the boundaries between the magnetic poles opposite to the gaps formed in said base yoke.

5. An objective lens driving device according to claim 2, wherein said annular permanent magnet is disposed with two of the boundaries between the magnetic poles thereof opposite to the gaps formed in said base yoke.

6. An objective lens driving device as in claims 1-5 wherein said focus control coil and said track control coils are disposed within the space between said permanent magnet and said base yoke so that effective magnetic fluxes intersect with each other.

7. An objective lens driving device according to claim 2, wherein said permanent magnet has an annular shape, the yoke surface of said base yoke facing said permanent magnet is concentric with said permanent magnet, the gaps are provided in the direction of the outer circumference of said permanent magnet, and plate-shaped yokes are fixedly arranged on the outer circumference of said base yoke at the gaps opposite said permanent magnet.

8. An objective lens driving device according to claim 7, wherein said focus control coil is formed in the shape of a ring and is disposed fixedly so that a current flows therethrough in the direction of the inner circumference of said permanent magnet and perpendicularly to the axis of the support shaft, and said track control coils are formed in a rectangular shape and are mounted on the plate-shaped yokes opposite to said permanent magnet so that some sides thereof are substantially parallel with the axis of the support shaft.

9. An objective lens driving device according to claims 7 or 8, wherein the gaps are fixedly and symmetrically arranged on said base yoke, and the plate-shaped yokes are fixedly and symmetrically arranged on said base yoke.

10. An objective lens driving device according to claim 7, wherein said focus control coil is formed in the shape of a ring and is disposed fixedly so that a current flows therethrough in the direction of the inner circumference of said permanent magnet and perpendicularly to the axis of the support shaft, said track control coils are formed in a rectangular shape, and the plate-shaped yokes are fixed to said base yoke opposite to said permanent magnet with some of the sides thereof substantially in parallel with the axis of the support shaft.

11. An objective lens driving device according to claim 10, wherein the gaps are formed symmetrically in said base yoke, and the plate-shaped yoke is fixedly and symmetrically arranged on said base yoke opposite to said permanent magnet.

12. An objective lens driving device according to claim 1, wherein said permanent magnet is formed in the shape of a ring, provided in the circumference thereof with recesses, and is disposed with the recesses opposite the gaps formed in the yoke surface of said base yoke.

13. An objective lens driving device according to claim 12, wherein the recesses formed in said annular permanent magnet are arranged symmetrically with respect to the axis of the support shaft, and the gaps formed in said base yoke are symmetrical with respect to the axis of the support shaft.

14. An objective lens driving device according to claims 12 or 13, wherein said annular permanent magnet is magnetized radially substantially perpendicular to the axis of the support shaft.

15. An objective lens driving device according to claims 12 or 13, wherein said track control coils are wound on said plate-shaped yokes, and the plate-shaped yokes are provided fixedly in the gaps in said base yoke so that a current flows through said track control coils in the direction of the axis of the support shaft.

16. An objective lens driving device according to claims 12 or 13, wherein said annular permanent magnet is magnetized radially substantially perpendicular to the axis of the support shaft, said track control coils are wound on the plate-shaped yokes, and the plate-shaped yokes are provided fixedly in the gaps in said base yoke so that a current flows through said track control coils in the direction of the axis of the support shaft.

17. An objective lens driving device according to claim 3, wherein said annular permanent magnet is disposed with two of the boundaries between the magnetic poles thereof opposite to one of the gaps formed in said base yoke.

* * * * *

UNITED STATES PATENT AND TRADEMARK OFFICE
CERTIFICATE OF CORRECTION

PATENT NO. : 5,105,405
DATED : April 14, 1992
INVENTOR(S) : Akira HASHIMOTO and Kenjiro KIME It is certified that error appears in the above-identified patent and that said Letters Patent is hereby corrected as shown below:

```
column 7, lines 45 & 49
delete "armature holder 1" and substitute --armature
holder 101--, respectively; and column 7, line 47
delete "objective lens 3 " and substitute --objective
lens 103--
```

Signed and Sealed this

Tenth Day of August, 1993

Attest:

MICHAEL K. KIRK

*Attesting Officer*    Acting Commissioner of Patents and Trademarks